(12) United States Patent
Luo et al.

(10) Patent No.: US 12,045,092 B2
(45) Date of Patent: Jul. 23, 2024

(54) ROLLABLE DISPLAY DEVICE

(71) Applicant: BOE Technology Group Co., Ltd., Beijing (CN)

(72) Inventors: Xiaofei Luo, Beijing (CN); Shangchieh Chu, Beijing (CN); Hong Zhu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 233 days.

(21) Appl. No.: 17/628,895

(22) PCT Filed: Apr. 13, 2021

(86) PCT No.: PCT/CN2021/086755
§ 371 (c)(1),
(2) Date: Jan. 20, 2022

(87) PCT Pub. No.: WO2021/233013
PCT Pub. Date: Nov. 25, 2021

(65) Prior Publication Data
US 2022/0253104 A1    Aug. 11, 2022

(30) Foreign Application Priority Data

May 22, 2020 (CN) .......................... 202010443112.X

(51) Int. Cl.
*G06F 1/16* (2006.01)
(52) U.S. Cl.
CPC .......... *G06F 1/1652* (2013.01); *G06F 1/1681* (2013.01)

(58) Field of Classification Search
CPC .. G06F 1/1652; G06F 1/1681; G06F 3/04164; G09F 9/301; G09F 9/30152
See application file for complete search history.

(56) References Cited

U.S. PATENT DOCUMENTS

| 9,877,384 B2 | 1/2018 | Lee et al. | |
| 2015/0208016 A1* | 7/2015 | Rymer | G09G 3/035 348/333.06 |

(Continued)

FOREIGN PATENT DOCUMENTS

| CN | 104021742 A | 9/2014 |
| CN | 108230937 A | 6/2018 |

(Continued)

OTHER PUBLICATIONS

International Search Report for PCT/CN2021/086755 Mailed Jun. 30, 2021.

*Primary Examiner* — Abhishek M Rathod
*Assistant Examiner* — Martin Antonio Asmat Uceda
(74) *Attorney, Agent, or Firm* — Ling Wu; Stephen Yang; Ling and Yang Intellectual Property

(57) ABSTRACT

A rollable display device, including a housing, a driving mechanism and a flexible bearing film which are provided in the housing, and a flexible display screen. The flexible bearing film is configured to rotate under the driving of the driving mechanism; a first end of the flexible display screen is fixed to the flexible bearing film, a second end of the flexible display screen is configured to extend out of the housing from an opening formed in the housing, and the flexible display screen can be rolled on the flexible bearing film and can be unfolded under the pulling of external force.

13 Claims, 4 Drawing Sheets

(56) References Cited

U.S. PATENT DOCUMENTS

| | | | |
|---|---|---|---|
| 2016/0054758 A1 | 2/2016 | Han | |
| 2016/0161983 A1* | 6/2016 | Lee | G06F 1/1652 |
| | | | 361/749 |
| 2016/0320804 A1* | 11/2016 | Takayanagi | H04M 1/0268 |
| 2017/0212556 A1* | 7/2017 | Jovanovic | G06F 1/1652 |
| 2017/0357287 A1* | 12/2017 | Yang | G09F 9/00 |
| 2019/0297736 A1* | 9/2019 | Xu | G06F 1/1679 |
| 2020/0135065 A1* | 4/2020 | Song | H05K 1/028 |
| 2021/0242420 A1 | 8/2021 | Luo et al. | |

FOREIGN PATENT DOCUMENTS

| | | | |
|---|---|---|---|
| CN | 109872639 A | 6/2019 | |
| CN | 109887419 A | 6/2019 | |
| CN | 110494909 A | 11/2019 | |
| CN | 110572496 A | 12/2019 | |
| CN | 111047995 A | 4/2020 | |
| CN | 111462635 A | 7/2020 | |
| CN | 111599278 A | 8/2020 | |
| JP | H09250606 A * | 9/1997 | F16H 1/20 |

* cited by examiner

ROLLABLE DISPLAY DEVICE

CROSS-REFERENCE TO RELATED APPLICATIONS

The present disclosure is a U.S. National Phase Entry of International Application PCT/CN2021/086755 having an international filing date of Apr. 13, 2021, which claims priority of Chinese patent application No. 202010443112X, filed on May 22, 2020 and entitled "Rollable Display Device", the content disclosed in the above-mentioned applications should be interpreted as being hereby incorporated by reference.

TECHNICAL FIELD

Embodiments of the present application relate to, but are not limited to, the technical field of display devices, in particular to a rollable display device.

BACKGROUND

With the progress of science and technology and the development of society, flexible display screens have gradually entered the field of vision of consumers, and rollable flexible display screens facilitate consumers' life as well as bring consumers a brand-new user experience. When some rollable display devices roll flexible display screens, due to limited diameter of reels for rolling the flexible display screens, with an increase of the number of roll turns, accumulation of stress and strain will increase continuously, and extrusion among film layers of the flexible display screens is severe, which will easily lead to display failure.

SUMMARY

The following is a summary of the subject matters described in the present disclosure in detail. The summary is not intended to limit the scope of protection of the claims.

An embodiment of the present application provides a rollable display device, including a housing, a driving mechanism and a flexible bearing film which are provided in the housing, and a flexible display screen. The flexible bearing film is configured to rotate under driving of the driving mechanism; a first end of the flexible display screen is fixed to the flexible bearing film, a second end of the flexible display screen is configured to extend out of the housing from an opening formed on the housing, and the flexible display screen can be rolled on the flexible bearing film and can be unfolded under pulling of an external force.

Other aspects may be comprehended upon reading and understanding of the drawings and the detailed descriptions.

BRIEF DESCRIPTION OF DRAWINGS

Accompanying drawings are used to provide an understanding of embodiments of the present application, form a part of the specification, and are used to explain the technical solutions of the embodiments of the present application together with the embodiments of the present application and are not intended to form limitations on the technical solutions of the embodiments of the present application.

REFERENCE SIGNS ARE 1, housing; 101, opening; 2, driving shaft; 201, first transmission fitting part; 202, first step; 3, driven shaft; 301, second transmission fitting part; 302, second step; 4, flexible bearing film; 401, transmission part; 402, first end of flexible bearing film; 403, second end of flexible bearing film; 5, flexible display screen; 501, first end of flexible display screen; 502, second end of flexible display screen; 6, transmission device; 601, first gear, 602, second gear; 603, third gear; 7, reel; 8, support piece; 9, retractable bracket; 901, first connecting rod; 902, second connecting rod; 11, first support plate; 12, second support plate; 13, first cover; and 14, second cover.

DETAILED DESCRIPTION

It should be understood by those of ordinary skills in the art that the technical solutions of the embodiments of the present application may be modified or replaced equivalently, and shall fall within the scope of the claims of the present application without departing from the spirit and scope of the technical solutions of the embodiments of the present application.

Figure 1:
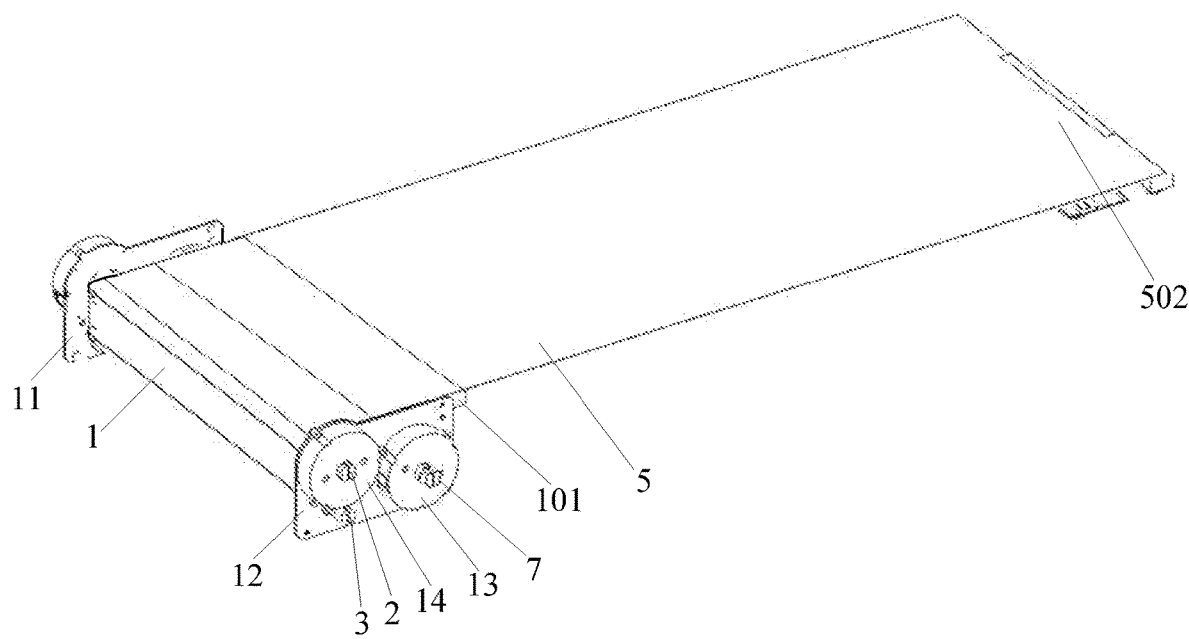
FIG. 1 is a schematic structural diagram of a rollable display device when a flexible display screen is in an unfolded state according to some exemplary embodiments.
Figure 2:
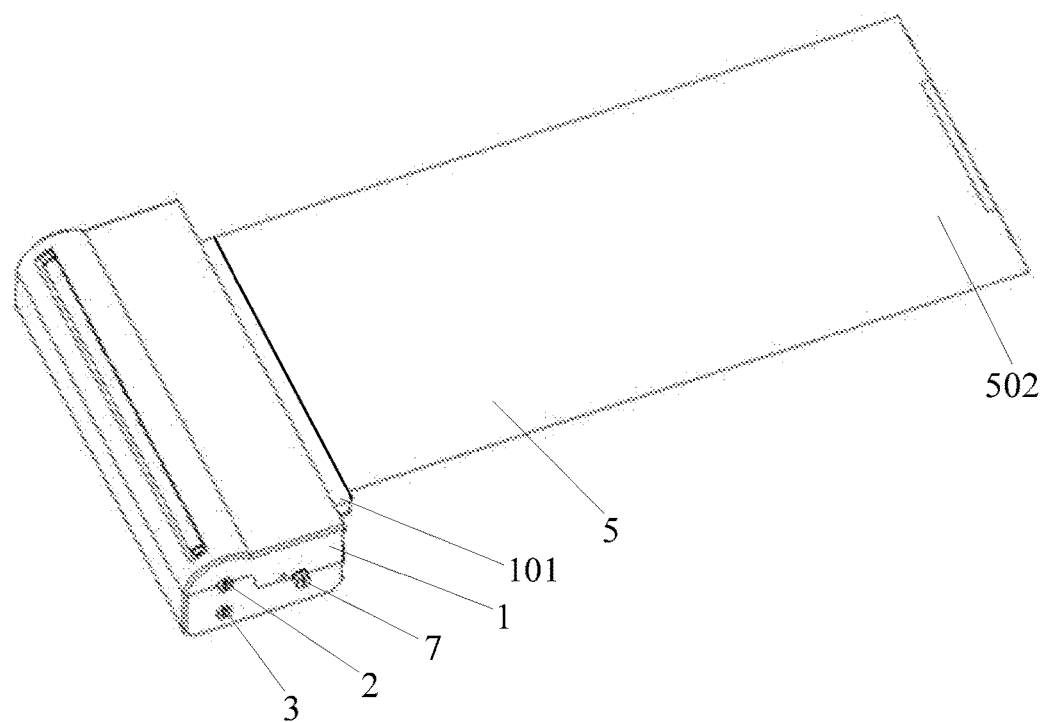
FIG. 2 is a schematic structural diagram of a rollable display device when a flexible display screen is in an unfolded state according to some other exemplary embodiments.
Figure 6:
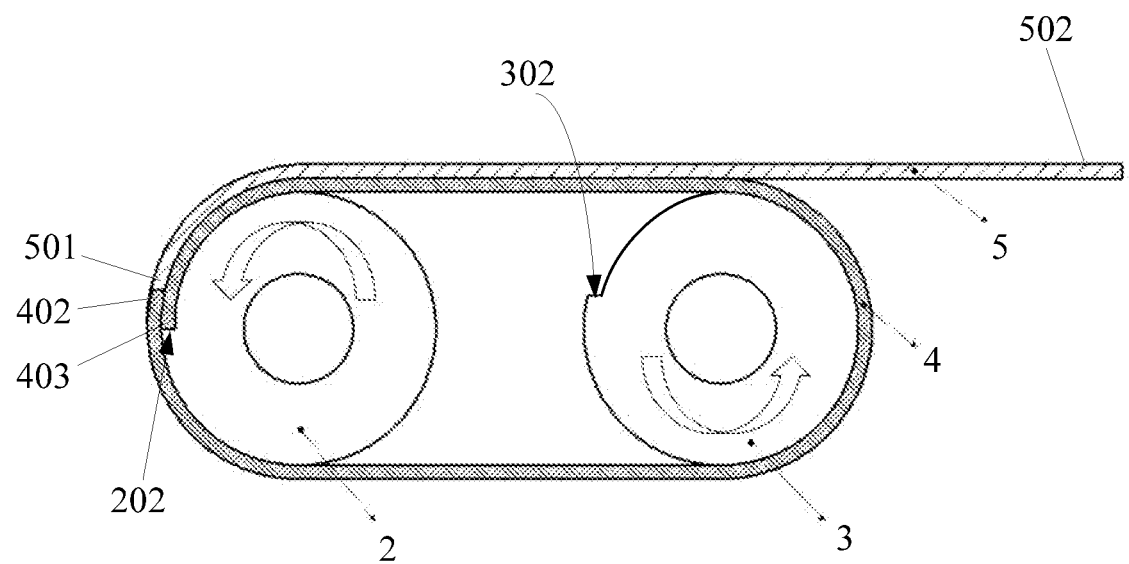
FIG. 6 is a schematic diagram of a mounting structure of a driving shaft, a driven shaft, a flexible bearing film and a flexible display screen of a rollable display device according to some exemplary embodiments.

As shown in FIG. 1, an embodiment of the present application provides a rollable display device, including a housing 1, a driving mechanism and a flexible bearing film which are provided in the housing 1, and a flexible display screen 5. As shown in FIG. 6, the flexible bearing film 4 is configured to rotate under driving of the driving mechanism. A first end 501 of the flexible display screen 5 is fixed to the flexible bearing film 4, and the flexible display screen 5 can be rolled on the flexible bearing film 4 and can be unfolded under pulling by an external force. As shown in FIG. 1, a second end 502 of the flexible display screen 5 is configured to extend out of the housing 1 from an opening 101 formed in the housing 1.

The rollable display device according to the embodiment of the present application is provided with the flexible bearing film 4 which rotates under the driving of the driving mechanism, and the flexible display screen 5 is rolled on the flexible bearing film 4 (the flexible bearing film is in a loop shape), so that a circumferential length of the flexible bearing film 4 may be designed to be larger according to actual needs, and the number of roll turns of the flexible display screen 5 may be reduced when the flexible display screen 5 is rolled on the flexible bearing film 4. Therefore, strain accumulation of the flexible display screen 5 may be reduced, extrusion among film layers of the flexible display screen 5 may be alleviated, and the flexible display screen 5 is not prone to damages.

Figure 4:
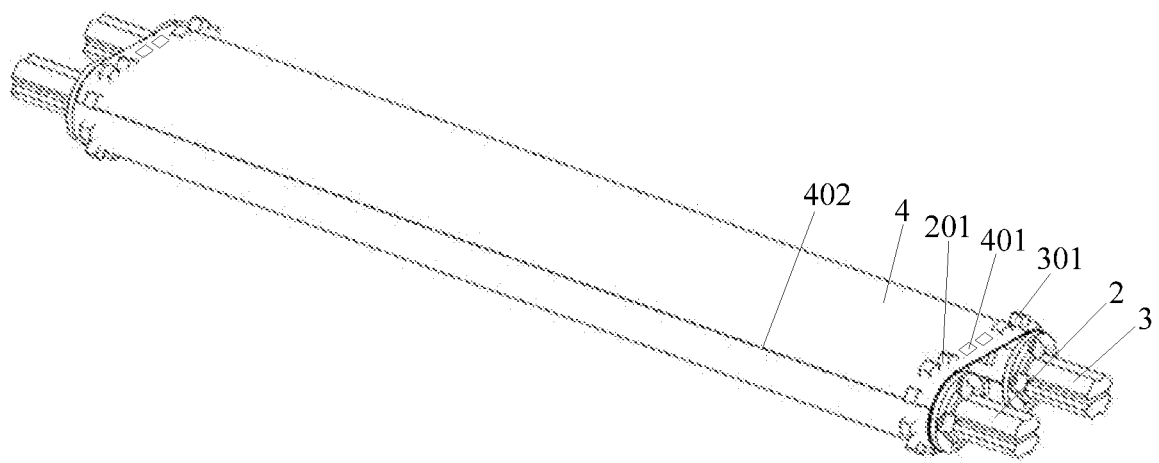
FIG. 4 is a schematic diagram of a mounting structure of a driving mechanism and a flexible bearing film of a rollable display device according to some exemplary embodiments.

As shown in FIG. 1, in some exemplary embodiments, the driving mechanism includes a driving shaft 2 and a driven shaft 3 which are arranged in the housing 1 and are rotatable, and a first driving component which can drive the driving shaft 2 to rotate. The flexible bearing film 4 is sleeved on the driving shaft 2 and the driven shaft 3 and configured to drive the driven shaft 3 to rotate when the driving shaft 2 rotates. In one example of the present embodiment, the driving shaft 2 and the driven shaft 3 are arranged in parallel, axial directions of the driving shaft 2 and the driven shaft 3 are perpendicular to a rotation direction of the flexible bearing film 4, and both ends of each of the driving shaft 2 and the driven shaft 3 may be arranged on the housing 1 in a rotatable manner. In some exemplary embodiments, multiple transmission parts 401 are arranged at positions, close to two side edges of the flexible bearing film 4 in the circumferential direction, and of the multiple transmission parts 401 may be arranged at even intervals. Multiple transmission fitting parts 201 are arranged at positions, close to two ends of the driving shaft 2 in the circumferential direction, and multiple second transmission fitting parts 301 are arranged at the positions, close to two ends of the driven shaft 3 in the circumferential direction. The first transmission fitting parts 201 and the second transmission fitting parts 301 are configured to fit the transmission parts 401 for transmission during the rotation of the flexible bearing film 4, so that the driving shaft 2 drives the driven shaft 3 to rotate by the flexible bearing film 4 during the rotation. In some exemplary embodiments, the transmission parts 401 may be through holes, and a shape of the through holes may be rectangular, trapezoidal, circular, etc. Both the first transmission fitting parts 201 and the second transmission fitting parts 301 are protrusions matched with the through hole, and the protrusions may be in a rectangular block shape, a trapezoidal block shape, a cylinder shape, a hemisphere shape, etc. Portions of the flexible bearing film 4 which are in contact with the driving shaft 2 and the driven shaft 3 during the rotation are attached to outer circumferential surfaces of the driving shaft 2 and the driven shaft 3. In some exemplary embodiments, a width of the flexible display screen 5 (not shown in FIG. 4) may be smaller than a width of the flexible bearing film 4, and the both side edges of the flexible display screen 5 are located between the transmission parts 401 on two sides of the flexible bearing film 4, so that the flexible display screen 5 does not interfere with the fitting of the transmission parts 401 with the first transmission fitting parts 201 and the second transmission fitting parts 301. As shown in FIG. 1, when the rollable display device in the present exemplary embodiment is not in use, the flexible display screen 5 is in a rolled-up state, and the second end 502 of the flexible display screen 5 is located outside the housing 1. When the flexible display screen 5 needs to be unfolded, the second end 502 of the flexible display screen 5 may be pulled by an external force to unfold the flexible display screen 5. The driving shaft 2 rotates forward in the unfolding process of the flexible display screen 5, and the driving shaft 2 rotates backward in the rolling process of the flexible display screen 5. The second end 502 of the flexible display screen 5 may be provided with a circuit board for connection with an external driving device to drive the flexible display screen 5 to display.

In some exemplary embodiments, material of the flexible bearing film 4 may include one or more of polyethylene (PE for short), Polypropylene (PP for short), Polystyrene (PS for short), Polyethylene Terephthalate (PET for short), Polyethylene Naphthalate (PEN for short), and Polyimide (PI for short). When the flexible display screen 5 is in the rolled state, the film layers will extrude each other, especially in a case of long-term static rolling or high temperature and humidity, stress relaxation and creep will occur, and the film layers will be easily damaged due to extrusion between the film layers. As shown in FIG. 6, a portion of the flexible bearing film 4 located between the driving shaft 2 and the driven shaft 3 has a certain deformation capacity since it is not in contact with the driving shaft 2 and the driven shaft 3. Thus, the deformation generated by the flexible display screen 5 may be absorbed, mutual extrusion pressure among the film layers of each turn of flexible display screen 5 may be effectively reduced, and the use reliability of the flexible display screen 5 is improved.

In some exemplary embodiments, the first driving component may be a motor, a torsion spring or a coil spring, etc. The motor is configured to drive the driving shaft 2 to rotate forward or backward to fit the unfolding or rolling action of the flexible display screen 5. A torsion spring and a coil spring may be configured to elastically deform during the unfolding process of the flexible display screen 5, and drive the driving shaft 2 to rotate backward by their own elasticity when the flexible display screen 5 needs to be rolled, so that the flexible display screen 5 is rolled. The torsion spring and the coil spring are collectively referred to as an elastic member. In some exemplary embodiments, the elastic member may be arranged at an end of the driving shaft 2, wherein one end of the elastic member is fixed to the driving shaft 2, and the other end of the elastic member is fixed to the housing 1.

As shown in FIG. 6, directions of two arrows in FIG. 6 respectively represent the rotation directions of the driving shaft 2 and the driven shaft 3 during the rolling process of the flexible display screen 5. In some exemplary embodiments, a first step 202 is arranged on an outer circumferential surface of the driving shaft 2, and a second step 302 is arranged on an outer circumferential surface of the driven shaft 3. The two ends of the flexible bearing film 4 are lapped and fixed (the flexible bearing film 4 is in a loop shape as a whole, and the loop shape may also be understood as a cylinder shape). The first end 501 of the flexible display screen 5 is butted with a first end 402 of the flexible bearing film 4. The driving mechanism is configured so that when a second end 403 of the flexible bearing film 4 fits one of the first step 202 and the second step 302 (that is, the second end 403 of the flexible bearing film 4 is filled at the first step 202 or the second step 302), the other one of the first step 202 and the second step 302 does not contact the flexible bearing film 4, and is configured so that neither of the first step 202 and the second step 302 contacts the flexible bearing film 4 when the second end 403 of the flexible bearing film 4 is in contact with the driving shaft 2 and the driven shaft 3. In one example of the present embodiment, the first step 202 is arranged along the axial direction of the driving shaft 2, and the second step 302 is arranged along the axial direction of the driven shaft 3. Heights of the first step 202 and the second step 302 are the same as a thickness of the flexible bearing film 4, and the thickness of the flexible bearing film 4 is the same as a thickness of the flexible display screen 5. During the rotation of the flexible bearing film 4, lapping positions of the two ends of the flexible bearing film 4 rotate accordingly, and the second end 403 of the flexible bearing film 4 may rotate to a position where it is in contact with the driving shaft 2, a position where it is in contact with the driven shaft 3, and a position where it is in contact with neither the driving shaft 2 nor the driven shaft 3. The first step 202 and the second step 302 are respectively arranged on the driving shaft 2 and the driven shaft 3, two ends of the flexible bearing film 4 are lapped and fixed, the first end 501 of the flexible display screen 5 is butted with the first end 402 of the flexible bearing film 4 (the first end 501 of the flexible display screen 5 may be adhered to an outer surface of the flexible bearing film 4 by an adhesive), and the second end 403 of the flexible bearing film 4 is used to fill the first step 202 or the second step 302. Thus, there will be no height difference between the first end 501 of the flexible display screen 5 and the outer surface of the flexible bearing film 4, and then, when the flexible display screen 5 is rolled on the flexible bearing film 4, the first end 501 of the flexible display screen 5 will not cause local stress concentration on the flexible display screen 5 and damage to the flexible display screen 5.

As shown in FIG. 6, in one example of the present embodiment, a diameter of the outer circumferential surface of the driving shaft 2 gradually increases from a lower position of the first step 202 to a higher position of the first step 202, and a diameter of the outer circumferential surface of the driven shaft 3 gradually increases from a lower position of the second step 302 to a higher position of the second step 302. Thus, bending radians of the outer circumferential surfaces of the driving shaft 2 and the driven shaft 3 change gradually and smoothly, and the bending radians of the portions where the flexible bearing film 4 is attached to the outer circumferential surfaces of the driving shaft 2 and the driven shaft 3 are also smooth, so that the flexible display screen 5 can be smoothly rolled around the flexible bearing film 4 without causing local stress concentration. In the present exemplary embodiment, the above-mentioned fitting of the second end 403 of the flexible bearing film 4 with the first step 202 and the second step 302 may be ensured by comprehensively designing parameters such as the diameters of the outer circumferential surfaces of the driving shaft 2 and the driven shaft 3, and the shaft spacing between the driving shaft 2 and the driven shaft 3. The structures of the driving shaft 2 and the driven shaft 3 may be the same. The larger the diameters of the outer circumferential surfaces of the driving shaft 2 and the driven shaft 3 are, the larger the shaft spacing between the driving shaft 2 and the driven shaft 3 is, the smaller the number of roll turns of the flexible display screen 5 is, the smaller the strain accumulation of the flexible display screen 5 is, and the less prone the flexible display screen 5 is to damages.

Figure 5:
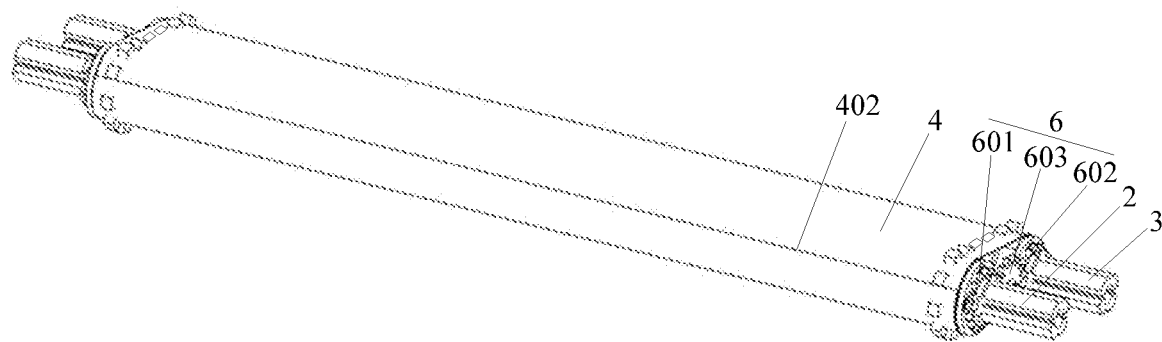
FIG. 5 is a schematic diagram of a mounting structure of a driving mechanism and a flexible bearing film of a rollable display device according to some other exemplary embodiments.

As shown in FIG. 5, in some exemplary embodiments, the rollable display device further includes a transmission device 6 arranged between the driving shaft 2 and the driven shaft 3, and the driving shaft 2 drives the driven shaft 3 to rotate synchronously through the transmission device 6. In the present exemplary embodiment, when the diameters of the outer circumferential surfaces of the driving shaft 2 and the driven shaft 3 are large, the required rolling force is small in the process of rolling the flexible display screen 5, and the driving shaft 2 easily drives the driven shaft 3 to rotate by the flexible bearing film 4. When the diameters of the outer circumferential surfaces of the driving shaft 2 and the driven shaft 3 are small, the required rolling force is large, and an additional transmission device needs to be added to drive the driving shaft 2 and the driven shaft 3 to rotate. In the present exemplary embodiment, the transmission device 6 is arranged so that a transmission speed and rotational displacement of the driving shaft 2 and the driven shaft 3 may be ensured to be the same all the time, thus ensuring the synchronization of the rotation of the driving shaft 2 and the rotation of the driven shaft 3. In the present exemplary embodiment, limits are not made to the structure of the transmission device 6, and the transmission device 6 may be a gear transmission mechanism, a belt transmission mechanism, a chain transmission mechanism or a linkage mechanism, etc. In one example of the present embodiment, the transmission device 6 is the gear transmission device, and the transmission device 6 includes a first gear 601 fixed to the driving shaft 2, a second gear 602 fixed to the driven shaft 3, and a third gear 603 rotatably arranged on the housing 1 and meshed with both the first gear 601 and the second gear. The first gear 601 and the second gear 602 are arranged at ends of the driving shaft 2 and the driven shaft 3 respectively. The transmission device 6 may be arranged at the ends of the driving shaft 2 and the driven shaft 3, and the ends of the driving shaft 2 and the driven shaft 3 may be located inside the housing 1 or extend out of the housing 1. The transmission device 6 may be arranged inside the housing 1 or arranged outside the housing 1.

Figure 3:
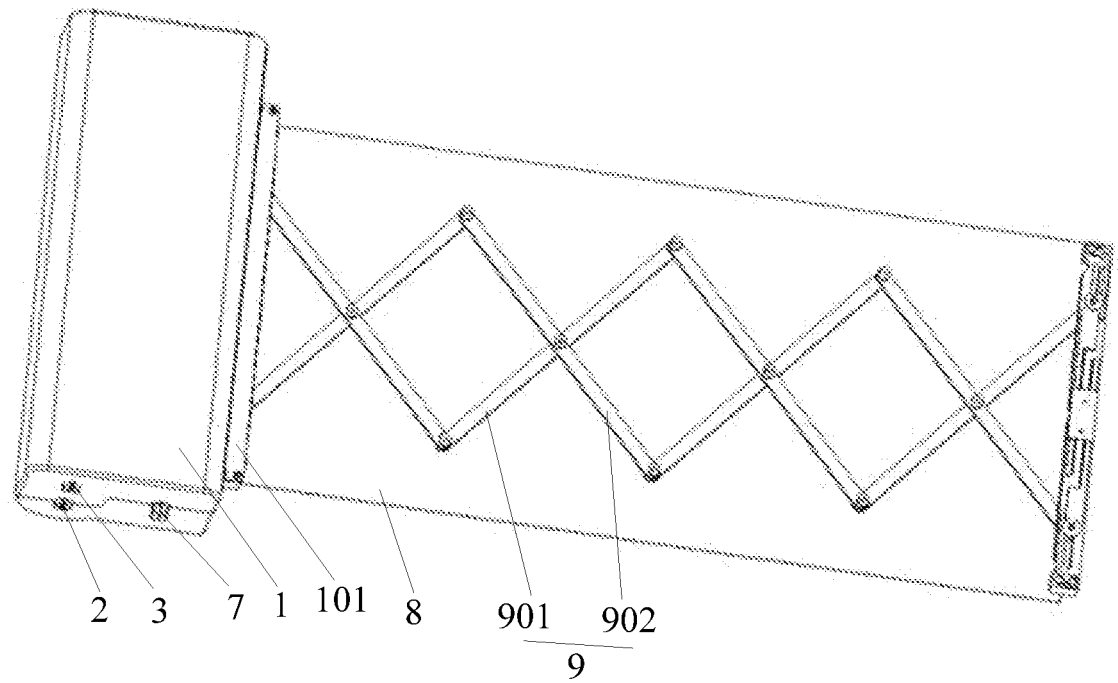
FIG. 3 is a schematic structural diagram of the rollable display device in FIG. 2 from another perspective according to some exemplary embodiments.
Figure 7:
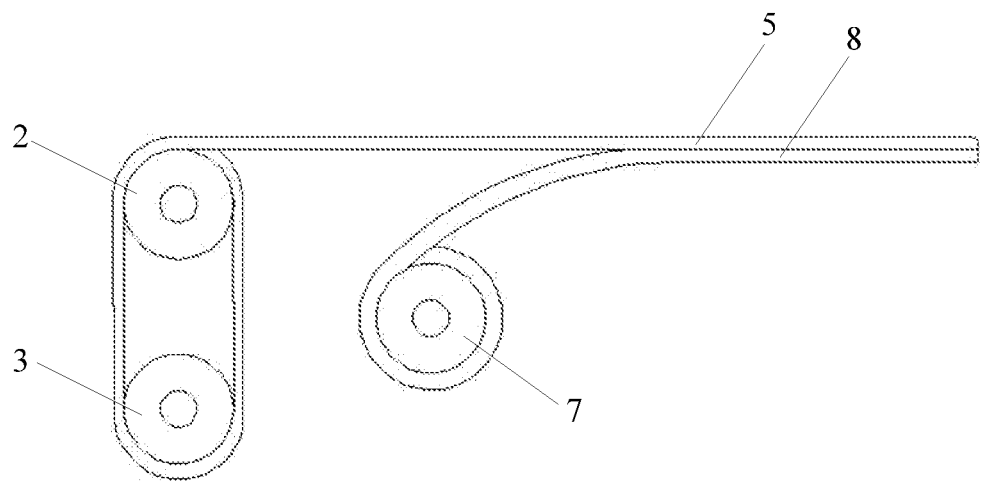
FIG. 7 is a schematic diagram of a mounting structure of a flexible display screen and a support piece of a rollable display device according to some exemplary embodiments.

As shown in FIG. 1, FIG. 3 and FIG. 7, in some exemplary embodiments, the rollable display device further includes a reel 7 rotatably arranged in the housing 1, a second driving component capable of driving the reel 7 to rotate, and a support piece 8. One end of the support piece 8 is fixed to the reel 7, and the other end of the support piece 8 extends out from the opening 101 on the housing 1 and is fixed to the second end 502 of the flexible display screen 5. The support piece 8 is configured to be rolled on the reel 7 when the flexible display screen 5 is in the rolled state and is configured to be unfolded and supported on a side of the flexible display screen 5 facing away from a display side when the flexible display screen 5 is in the unfolded state. In one example of the present embodiment, the support piece 8 may be a thin metal sheet that can be rolled on the reel 7 and can be unfolded, for example, it may be a stainless steel sheet and the like. The support piece 8 may be rolled on the reel 7 or unfolded along with the unfolding action or rolling action of the flexible display screen 5. One end of the support piece 8 is fixed to the reel 7, the other end of the support piece 8 extends out from the opening 101 on the housing 1 and is fixed to the second end 502 of the flexible display screen 5, and the rest of the support piece 8 is not connected with the flexible display screen 5. The support piece 8 and the flexible display screen 5 are rolled on the reel 7 and the flexible bearing film 4, respectively. An axial direction of the reel 7 is parallel to the axial direction of the driving shaft 2 and the driven shaft 3. A width of the support piece 8 may be the same as the width of the flexible display screen 5. When the flexible display screen 5 is in the unfolded state, the flexible display screen 5 may be supported by the support piece 8 arranged. In one example of the present embodiment, the second driving component may be a motor, a torsion spring or a coil spring, etc. The motor is configured to be capable of driving the reel 7 to rotate forward or backward to fit the unfolding action or rolling action of the support piece 8. The torsion spring and the coil spring may be configured to elastically deform during the unfolding process of the support piece 8, and drive the reel 7 to rotate backward by their own elasticity when the support piece 8 needs to be rolled, so that the support piece 8 is rolled. The torsion spring and the coil spring are collectively referred to as elastic members. In some exemplary embodiments, the elastic member may be arranged at the end of the reel 7, one end of the elastic member is fixed to the reel 7, and the other end of the elastic member is fixed to the housing 1.

As shown in FIG. 1, in some exemplary embodiments, the rollable display device further includes a first support plate 11 and a second support plate 12, a first cover 13 and a second cover 14, which are oppositely arranged, and the housing 1 is fixed between the first support plate 11 and the second support plate 12. Two ends of each of the driving shaft 2, the driven shaft 3 and the reel 7 may be rotatably arranged on the housing 1 or rotatably arranged on the first support plate 11 and the second support plate 12. Two ends of each of the reel 7 and the driving shaft 2 movably penetrate out of the housing 1. One first cover 13 may be arranged, and the first cover 13 is fixed to the first support plate 11 or the second support plate 12 and covers one end of the reel 7. Or two first cover 13 are arranged, and the two first covers 13 are respectively fixed to the first support plate 11 and the second support plate 12 and cover the two ends of the reel 7. In some exemplary embodiments, the second driving component is the torsion spring and is sleeved at an end of the reel 7, wherein two end pins of the torsion spring are respectively fixed to the reel 7 and an inner wall of the first cover 13. Only one end of the reel 7 may be provided with the second driving component, or the two ends of the reel 7 may each be provided with the second driving component. One or two second covers 14 may be arranged, and the second cover(s) 14 is arranged in the same manner as the first cover 13. The second cover 14 covers an end of the driving shaft 2. The first driving component is the torsion spring and sleeved on the end of the driving shaft 2. The two end pins of the torsion spring are respectively fixed to the driving shaft 2 and the second cover 14. Only one end of the driving shaft 2 may be provided with the first driving component, or two ends of the driving shaft 2 may be each provided with the first driving component.

As shown in FIG. 3, in some exemplary embodiments, the rollable display device further includes a retractable bracket 9 located outside the housing 1. One end of the retractable bracket 9 is fixed to the housing 1 (which may be a position, close to the opening 101, of the housing 1), and the other end of the retractable bracket 9 is fixed to the second end 502 of the flexible display screen 5 (shown in FIG. 1). The retractable bracket 9 is configured to be supported on the side of the support piece 8 facing away from the flexible display screen 5 (shown in FIG. 1) when the flexible display screen 5 (shown in FIG. 1) is in the unfolded state. The retractable bracket 9 of the present exemplary embodiment is gradually unfolded with the flexible display screen 5 during the unfolding process of the flexible display screen 5 (shown in FIG. 1), and is gradually folded with the flexible display screen 5 (shown in FIG. 1) during the rolling process of the flexible display screen 5 (shown in FIG. 1). The retractable bracket 9 may support the flexible display screen 5 (shown in FIG. 1) in the unfolded state. The support piece 8 is located between the flexible display screen 5 (shown in FIG. 1) and the retractable bracket 9. A surface of the support piece 8 is a flat surface. Thus, when the support surface of the retractable bracket 9 is uneven, the support piece 8 may provide a flat support surface for supporting the flexible display screen 5 (shown in FIG. 1) to protect the flexible display screen 5 (shown in FIG. 1). No limits are made to the structure of the retractable bracket 9 in the present exemplary embodiment. In one example of the present embodiment, the retractable bracket 9 includes multiple first connecting rods 901 which are hinged in sequence and multiple second connecting rods 902 which are hinged in sequence. Both the first connecting rods 901 and the second connecting rods 902 may be in a flat structure. A middle position of each first connecting rod 901 is hinged with a middle position of a corresponding second connecting rod 902. The first connecting rods 901 and the second connecting rods 902 located at one end of the retractable bracket 9 are both hinged on an outer wall of the housing 1, and the first connecting rods 901 and the second connecting rods 902 located at the other end of the retractable bracket 9 are both hinged at the second end 502 of the flexible display screen 5 (shown in FIG. 1). The hinged positions of the retractable support 9 may all be hinged by hinged shafts.

In the description of the present disclosure, unless otherwise specified and defined, terms "connection", "fixed connection", "mounting", and "assembly" should be generally understood. For example, the term may refer to a fixed connection, or a detachable connection, or an integral connection. The terms "mounting", "connection", and "fixed connection" may be direct connection, or indirect connection through an intermediate, or internal communication between two elements. Those of ordinary skills in the art may understand the meanings of the terms in the present disclosure.

The invention claimed is:

1. A rollable display device, comprising a housing, a driving mechanism and a flexible bearing film which are provided in the housing, and a flexible display screen, wherein:

the flexible bearing film is configured to rotate under driving of the driving mechanism;

a first end of the flexible display screen is fixed to the flexible bearing film, a second end of the flexible display screen is configured to extend out of the housing from an opening formed on the housing, and the flexible display screen is capable of being rolled on the flexible bearing film and unfolded under pulling of an external force;

the driving mechanism comprises a driving shaft and a driven shaft which are arranged in the housing and are rotatable, and a first driving component which can drive the driving shaft to rotate, the flexible bearing film is sleeved on the driving shaft and the driven shaft and configured to drive the driven shaft to rotate when the driving shaft rotates;

a first step is arranged on an outer circumferential surface of the driving shaft, a second step is arranged on an outer circumferential surface of the driven shaft, two ends of the flexible bearing film are lapped and fixed, and the first end of the flexible display screen is butted with a first end of the flexible bearing film; and the driving mechanism is configured so that when a second end of the flexible bearing film fits one of the first step and the second step, the other one of the first step and the second step is not in contact with the flexible bearing film, and is configured so that neither the first step or the second step is in contact with the flexible bearing film when the second end of the flexible bearing film is not in contact with the driving shaft and the driven shaft.

2. The rollable display device of claim 1, wherein a plurality of transmission parts are arranged at positions, close to two side edges, of the flexible bearing film in a circumferential direction, a plurality of transmission fitting parts are arranged at positions, close to two ends, of the driving shaft and the driven shaft in the circumferential direction, and the transmission fitting parts are configured to fit the transmission parts for transmission during rotation of the flexible bearing film.

3. The rollable display device of claim 2, wherein the transmission parts are through holes, and the transmission fitting parts are protrusions matched with the through holes.

4. The rollable display device of claim 2, wherein a width of the flexible display screen is smaller than a width of the flexible bearing film, and two side edges of the flexible display screen are located between the transmission parts on two sides of the flexible bearing film.

5. The rollable display device of claim 1, wherein heights of the first step and the second step are the same as a thickness of the flexible bearing film, and the thickness of the flexible bearing film is the same as a thickness of the flexible display screen.

6. The rollable display device of claim 1, wherein a diameter of the outer circumferential surface of the driving shaft gradually increases from a lower position of the first step to a higher position of the first step, and a diameter of the outer circumferential surface of the driven shaft gradually increases from a lower position of the second step to a higher position of the second step.

7. The rollable display device of claim 1, further comprising a transmission device arranged between the driving shaft and the driven shaft, wherein the driving shaft drives the driven shaft to rotate synchronously by the transmission device.

8. The rollable display device of claim 7, wherein the transmission device is a gear transmission device, and the transmission device comprises a first gear fixed to the driving shaft, a second gear fixed to the driven shaft, and a third gear rotatably arranged on the housing and meshed with both the first gear and the second gear.

9. The rollable display device of claim 1, further comprising a reel rotatably arranged in the housing, a second driving component capable of driving the reel to rotate, and a support piece, wherein one end of the support piece is fixed to the reel, the other end of the support piece extends out from the opening and is fixed to a second end of the flexible display screen, and the support piece is configured to be rolled on the reel when the flexible display screen is in a rolled state and configured to be unfolded and supported on a side of the flexible display screen facing away from a display side when the flexible display screen is in an unfolded state.

10. The rollable display device of claim 9, further comprising two support plates and a first cover, wherein the housing is fixed between the two support plates, two ends of the reel movably penetrate out of the housing, the first cover is fixed to the support plates and covers an end of the reel, the second driving component is a torsion spring and sleeved on the end of the reel, and two end pins of the torsion spring are respectively fixed to the reel and the first cover.

11. The rollable display device of claim 9, further comprising a retractable bracket located outside the housing, wherein one end of the retractable bracket is fixed to the housing, the other end of the retractable bracket is fixed to the second end of the flexible display screen, and the retractable bracket is configured to be supported on a side of the support piece facing away from the flexible display screen when the flexible display screen is in the unfolded state.

12. The rollable display device of claim 11, wherein the retractable bracket comprises a plurality of first connecting rods which are hinged in sequence and a plurality of second connecting rods which are hinged in sequence, a middle position of each first connecting rod is hinged with a middle position of a corresponding second connecting rod, the first connecting rods and the second connecting rods located at one end of the retractable bracket are all hinged on the housing, and the first connecting rods and the second connecting rods located at the other end of the retractable bracket are all hinged at the second end of the flexible display screen.

13. The rollable display device of claim 1, further comprising two support plates and a second cover, wherein the housing is fixed between the two support plates, two ends of the driving shaft movably penetrate out of the housing, the second cover is fixed to the support plates and covers an end of the driving shaft, the first driving component is a torsion spring and sleeved on the end of the driving shaft, and two end pins of the torsion spring are respectively fixed to the driving shaft and the second cover.

\* \* \* \* \*